US010230657B2

(12) United States Patent
Schmoetzer et al.

(10) Patent No.: US 10,230,657 B2
(45) Date of Patent: Mar. 12, 2019

(54) BUS SYSTEM, METHOD OF OPERATING A BUS SYSTEM, AND FLUIDIC SYSTEM WITH A BUS SYSTEM

(71) Applicant: BUERKERT WERKE GMBH, Ingelfingen (DE)

(72) Inventors: Ralf Schmoetzer, Doerzbach (DE); Volker Haaf, Crailsheim (DE); Marcus Fischer, Neuenstadt Ot Stein (DE); Jochen Krauss, Kuenzelsau (DE); Jochen Froelich, Pfedelbach (DE)

(73) Assignee: BUERKERT WERKE GMBH (DE)

( * ) Notice: Subject to any disclaimer, the term of this patent is extended or adjusted under 35 U.S.C. 154(b) by 870 days.

(21) Appl. No.: 14/080,459

(22) Filed: Nov. 14, 2013

(65) Prior Publication Data

US 2014/0189131 A1    Jul. 3, 2014

(30) Foreign Application Priority Data

Nov. 14, 2012  (DE) ......................... 10 2012 022 299

(51) Int. Cl.
*H04L 12/24* (2006.01)
*H04L 12/40* (2006.01)
(Continued)

(52) U.S. Cl.
CPC ............ *H04L 47/70* (2013.01); *H04L 12/403* (2013.01); *H04L 41/0803* (2013.01);
(Continued)

(58) Field of Classification Search
CPC ... H04L 47/70; H04L 12/403; H04L 41/0886; H04L 61/6027; H04L 41/0803;
(Continued)

(56) References Cited

U.S. PATENT DOCUMENTS 4,626,843 A * 12/1986 Szeto ................... G06F 13/374
370/462
5,708,831 A * 1/1998 Schon ................. G06F 12/0669
340/9.16

(Continued)

FOREIGN PATENT DOCUMENTS

| CN | 101170470 | 4/2008 | ............ H04L 12/40 |
| CN | 101170471 | 4/2008 | ............ H01L 12/40 |

(Continued)

OTHER PUBLICATIONS

Yadunandana Yellambalase, Minsu Choi, Automatic Node Discovery in CAN (Controller Area Network) Controllers using Reserved Identifier Bits, IEEE, IMTC 2007—Instrumentation and Measurement Technology Conference Warsaw, Poland, May 1-3, 2007.*

(Continued)

*Primary Examiner* — Emmanuel L Moise
*Assistant Examiner* — Robert A Shaw
(74) *Attorney, Agent, or Firm* — Hayes Soloway P.C.

(57) ABSTRACT

BUS system, method of operating a BUS system, and fluidic system with a BUS system, the BUS system comprising a multitude of users. Information regarding an allocation feature is transmitted to the users of the BUS system by other users of a group of users of the BUS system and by the respective users themselves.

18 Claims, 7 Drawing Sheets

(51) Int. Cl.
*H04L 29/12* (2006.01)
*H04L 12/403* (2006.01)
*H04L 12/911* (2013.01)

(52) U.S. Cl.
CPC ...... *H04L 41/0886* (2013.01); *H04L 61/2038* (2013.01); *H04L 61/6027* (2013.01); *H04L 2012/40215* (2013.01)

(58) Field of Classification Search
CPC ...... H04L 61/2038; H04L 2012/40215; G05B 19/0426
USPC ........................................................ 709/226
See application file for complete search history.

(56) References Cited

U.S. PATENT DOCUMENTS

| | | | | |
|---|---|---|---|---|
| 5,745,699 | A * | 4/1998 | Lynn | G06F 12/0669 709/217 |
| 5,835,723 | A * | 11/1998 | Andrews | G06F 9/542 370/252 |
| 6,216,172 | B1 * | 4/2001 | Kolblin | H04L 29/12254 709/227 |
| 2006/0253615 | A1 * | 11/2006 | Flach | G06F 13/385 710/3 |
| 2008/0104294 | A1 | 5/2008 | Huck et al. | 710/109 |
| 2009/0187691 | A1 * | 7/2009 | Huck | H04L 29/1232 710/114 |
| 2010/0082873 | A1 * | 4/2010 | Rosen | H04L 12/40182 710/313 |
| 2010/0088537 | A1 * | 4/2010 | Hua | H04L 12/4135 713/600 |
| 2010/0185784 | A1 | 7/2010 | De Nie et al. | 710/9 |
| 2012/0054483 | A1 * | 3/2012 | Haaf | G06F 9/4403 713/2 |
| 2012/0066356 | A1 * | 3/2012 | Nguyen | H04L 29/12254 709/220 |
| 2013/0057339 | A1 * | 3/2013 | Koudar | G06F 13/4252 327/565 |
| 2013/0238200 | A1 * | 9/2013 | Woodcock | A01M 7/0089 701/50 |
| 2013/0275647 | A1 * | 10/2013 | Bradley | G06F 13/385 710/309 |
| 2013/0326099 | A1 * | 12/2013 | Schmidt | H04L 29/12254 710/110 |
| 2015/0222594 | A1 * | 8/2015 | Fritsch | H04L 12/413 370/252 |

FOREIGN PATENT DOCUMENTS

| | | | | |
|---|---|---|---|---|
| CN | 101755259 | | 6/2010 | ............. G06F 13/42 |
| DE | 197 13 240 | | 10/1998 | ............. H04L 12/28 |
| DE | 19713240 | A1 * | 10/1998 | ....... H04L 29/12254 |
| DE | 101 27 963 | | 1/2003 | ........... H04L 12/407 |
| DE | 10127963 | A1 * | 1/2003 | ......... G05B 19/0426 |
| DE | 10127963 | A1 * | 1/2003 | ......... G05B 19/0426 |
| DE | 10329682 | A1 * | 1/2005 | ............ G06F 13/387 |
| DE | 10 2004 039 447 | | 12/2005 | ............. G06F 13/16 |
| DE | 102004039447 | A1 * | 12/2005 | ............. G06F 13/42 |
| DE | 102007050280 | A1 * | 5/2008 | ......... H04L 12/4135 |
| DE | 10 2008 019 282 | | 10/2009 | ........... H04L 12/413 |
| DE | 102008019282 | B3 * | 10/2009 | ........... H04L 12/413 |
| DE | 102008019282 | B3 * | 10/2009 | ........... H04L 12/413 |
| WO | WO 2009121622 | A2 * | 10/2009 | ........... H04L 12/407 |

OTHER PUBLICATIONS

Gianluca Cena and Adriano Valenzano "A Protocol for Automatic Node Discovery in CANopen Networks", IEEE Transactions on Industrial Electronics, vol. 50, No. 3, Jun. 2003.*
Y. Yellambalase and M. Choi, "Automatic Node Discovery in CAN (Controller Area Network) Controllers using Reserved Identifier Bits", IMTC 2007—Instrumentation and Measurement Technology Conference, Warsaw, Poland, May 1-3, 2007.*
L.A. Luft, L. Anderson, F. Cassidy, "NMEA 2000 A Digital Interface for the 21st century", Institute of Navigation's 2002 National Technical Meeting, San Diego, CA, Jan. 30 2002.*
M. Junger Introduction to J1939 Version 1.1 Application Note AN-ION-1-3100, Apr. 27, 2010.*
German Search Report issued in corresponding German Patent Appln. Serial No. 10 2012 022 299.8 dated Jul. 11, 2013 (9 pgs).
European Search Report issued in corresponding European Patent Appln. Serial No. 13192977 dated Jan. 23, 2014 (7 pgs).
Chinese Office Action issued in application No. 201310567811.5, dated Nov. 28, 2016 (14 pgs).

* cited by examiner

BUS SYSTEM, METHOD OF OPERATING A BUS SYSTEM, AND FLUIDIC SYSTEM WITH A BUS SYSTEM

FIELD OF THE INVENTION

The invention relates to a BUS system with a multitude of users, a method of operating a BUS system, and a fluidic system with such a BUS system.

TECHNICAL BACKGROUND

The users of a BUS system, in particular of a field bus system, are in many cases addressed with the aid of DIP or rotary switches. This manual definition of the address, however, is not very operator-friendly and frequently involves great project planning efforts. Moreover, the manual setting of addresses is error-prone since two identical addresses may be assigned inadvertently. The DIP or rotary switches require space in the components connected by means of the BUS system and increase the costs thereof. In addition, an IP65 protectability of the components as specified in the international classification can often only be achieved with great effort and additional costs, for example by providing additional housings or covers. Furthermore, many devices or components such as those used, e.g., in fluidic systems, are provided with a fixed address on the part of the manufacturer. This address must be taken into account or converted manually when allocating the addresses of the other components of the BUS system.

Methods for auto-addressing of components of BUS systems are known which operate on the master-slave principle, in which a master unit assigns the respective addresses to the slave units of the BUS system. In BUS systems that operate in accordance with the CAN BUS standard and use CANopen as the communication protocol, the addressing is effected according to the master-slave principle, based on LSS protocols. According to a further, but likewise complex method, an address is assigned to each user of the BUS system by means of an external control in an acyclic service.

SUMMARY

It is an object of the present invention to indicate an improved BUS system, an improved method of operating a BUS system, and an improved fluidic system with such a BUS system.

According to an aspect of the invention, a BUS system with a multitude of users is indicated, wherein users are devices. Information regarding an allocation feature is transmitted to the users of the BUS system by other users of a group of users of the BUS system. The respective users of the group can transmit this information themselves.

The information regarding the allocation property of the users may be the respective address of these users. In particular, the users of the group of the BUS system may be designed to cumulatively store and to deposit the received information regarding the allocation feature of the other users, that is, in particular the addresses (i.e. the addresses of the users in the bus system or also in the network, or also network addresses) of the other users, as a complete basis for the communication with these users within the BUS system. The users may be designed to store this information locally. If, according to one embodiment, the group of users comprises all users of the BUS system, the complete information necessary for the communication within the BUS system is available in each of the users. In other words, each user may have a complete list of the addresses of all other users of the BUS system at its disposal. A user having a master functionality, also referred to as a master unit, may be dispensed with in such a BUS system. Advantageously, all users of the BUS system may have the same network functionality at their disposal. The BUS system is able to configure itself in respect of the address assignment. This facilitates the expansion and reduction of the BUS system and also the exchange and the integration of the users.

According to a further embodiment, the users do also not require an external trigger signal causing them to communicate information about their respective allocation feature, that is, for example their address, to the other users. In particular, no master unit is necessary which could send such a trigger signal. A user of the BUS system may, for example, be designed to send information about its allocation feature after it has detected a supply voltage.

According to a further embodiment, the BUS system may be a field bus system. More particularly, it may be a CAN-based field bus system or a BUS system which is compatible with CAN. CANopen or a communication protocol compatible with CANopen may be used as the communication protocol.

According to the prior art, in a CANopen network there always exists an NMT master (NMT=network management); the other users are NMT slaves. The NMT master has complete control over the slave users and, for example, can change the operating state thereof. For example, the NMT master can put the slave users into one of the states defined in the CANopen standard, namely "Initialization", "Pre-Operational", "Operational", and "Stopped", or can alter the state of a slave user. According to the CANopen standard, in the "Pre-Operational" state, the slave users can communicate only via SDO messages (SDO=Service Data Object). In the "Stopped" state, the users communicate exclusively via NMT and Heartbeat messages. They can neither send PDO messages (PDO=Process Data Objects) nor Emergency messages. The standard principle for address assignment in a CANopen network is the use of an LSS master which, using LSS protocols, allocates a respective address to the users of the network.

According to an embodiment, however, all users of the BUS system are equipped with an equivalent network functionality. Thus, in other words, all users can, for example, feature the functionality of an NMT master and, for example, can put themselves or other users into a different operating state. In addition, the users of the BUS system may, for example, not be subject to any restriction with respect to the type of messages sent by them. In order to send a respective message, the users can, for example, change their state on their own. Just as the users of the BUS system can be regarded as master units in accordance with their network functionality, in a similar manner all users can also be regarded as slave units. A division into or differentiation between master and slave units is not very meaningful in this connection and shall not be made since the users of the BUS system may be equipped with an equivalent network functionality.

The users of the BUS system may, furthermore, be designed to cumulatively store information about a link between the allocation feature of a user and an identity or identifier of this user. Such an identity or identifier of the user may be its hardware address, but also, e.g., an assigned measuring point designation. This information may be locally deposited in the users which may be configured accordingly.

The group of users may comprise all users of the BUS system, so that advantageously all of the addresses can be assigned automatically within the BUS system.

According to a further embodiment, the users may further be designed to generate a random preliminary address of their own such that this address is different from each of the cumulatively stored addresses of the other users. In this way, it is possible to avoid that addresses are assigned twice.

The users of the BUS system may be designed to transmit their address in an address telegram to the other users of the BUS system. An address telegram may be a telegram in accordance with the CAN standard and/or in accordance with the CANopen communication protocol. More specifically, the address telegram may be a correspondingly configured data frame in accordance with the CAN standard.

In addition to information about an allocation feature of the sending user, the address telegram may comprise information with respect to a hierarchy status of this user. The hierarchy status preferably determines a rank or hierarchical place of the respective user within an overall hierarchy of the users of the BUS system. As a criterion for determining a hierarchy status of a particular user, its current operating status or operating state, its hardware address, serial number or any other suitable information about this user may be used, for example.

According to a further embodiment, at least one recipient of the address telegram is designed to check the address present in the address telegram received for a conflict with its own preliminary address. If a conflict occurs, such conflict can be resolved, for example, with the aid of a value of a serial number, a manufacturer number or some other qualification feature of the users which are in conflict with each other. For example, a lower serial number or manufacturer number may stand for a higher priority. Thus, in other words, that user which has the lower or smaller serial number can prevail over that user which has the higher serial number or manufacturer number, in respect of the assignment of the addresses. A further possibility of resolving the conflict between two addresses is a comparison between the hierarchy status of the sender (the user of the BUS system sending the address telegram) and the hierarchy status of the recipient (the user of the BUS system receiving the address telegram). In both cases, the inferior user gives up its address; the user that is superior in the comparison keeps its address. The generation and selection of a new preliminary address by the inferior user is effected in a similar way in both cases of conflict elimination.

If, according to one embodiment, the conflict of addresses is resolved on the basis of the hierarchy status of the users, the recipient of the address telegram may at first read out the status information with regard to the hierarchy status of the sender that is present in the address telegram received. If the hierarchy status of the recipient ranks lower in an overall hierarchy of the BUS system than the hierarchy status of the sender as stated in the address telegram, the recipient may give up its own preliminary address. Subsequently, it may generate a new random preliminary address and communicate it to the other users of the BUS system in a further address telegram. That is, in other words, the user that is inferior in the hierarchy comparison gives up its address.

In the reverse case, in which the hierarchy status of the recipient ranks higher in an overall hierarchy of the BUS system than the hierarchy status of the sender as stated in the address telegram, the recipient maintains its address. It defends its address by making no change and by communicating its own (unchanged) address to the other users of the BUS system in a further address telegram.

To prevent any conflicts between the addresses of the individual users, the users may be designed to communicate an address telegram to the other users of the BUS system only after a randomly determined first waiting time has elapsed. This first waiting time may be between 40 ms and 2.8 s and may be determined, e.g., with the aid of a random number generator. As a basis for the random number generator, use may be made of, e.g., a processor number or processor address or a manufacturing number of the user concerned, or also an external signal or event detected at an input of the user, e.g. a noise.

After the users of the BUS system have at least sent a first address telegram and have preliminarily defined their own address, this address can be verified in a further step.

According to a further embodiment, to this end the users may be designed to observe a randomly determined second waiting time after having sent at least a first address telegram. The second waiting time may be determined in the same or a similar manner as the first waiting time and, in particular, may be between 40 ms and 630 ms. During this second waiting time, the user can check any incoming address telegrams of other users with a view to a conflict with its own preliminary address. If, within the second or a further waiting time, it does not receive an address telegram which causes a conflict, it can define its preliminary address as a fixed address.

If, however, a conflict occurs during the second waiting time, the user may further be designed to resolve this conflict again by means of a comparison between, e.g., the serial number or manufacturer number and/or by means of a comparison between its own hierarchy status and a hierarchy status of the sender. The individual steps of this conflict resolution may be carried out in the same way as or similarly to the conflict resolution described above.

The users of the BUS system can defend defined addresses; this may also apply to default addresses or addresses defined in connection with an earlier address assignment. According to a further advantageous embodiment, the users of the BUS system may be designed to maintain their own fixed address in response to an address telegram of a further user which comprises an address that is in conflict with their fixed address. The users may respond thereto by transmitting an address telegram comprising their fixed address to the other users of the BUS system.

According to a further aspect of the invention, furthermore a fluidic system is indicated which comprises a BUS system according to the above-mentioned aspects of the invention. In particular, the users of this BUS system may be fluidic components such as, e.g., valves, sensors or measuring instruments.

According to a further aspect of the invention, a method of operating a BUS system including a multitude of users is indicated. Information regarding an allocation feature is transmitted to the users of the BUS system by other users of a group of the BUS system and by the respective users of the group themselves. In particular, the information regarding the allocation feature of the users may be an address of these users within the BUS system.

According to an embodiment, the users of the group of the BUS system may cumulatively store and locally deposit the received information regarding the allocation feature of the other users as a complete basis for a communication with these users within the BUS system. In particular, the group may include all users of the BUS system. The users of the BUS system may be equivalent with regard to their network functionality. In particular, the BUS system may comprise no user which operates in accordance with a master functionality.

The same or similar advantages as have already been mentioned with respect to the BUS system according to aspects of the invention are applicable in the same or a similar manner to the fluidic system and also to the method of operating the BUS system and, for this reason, will not be repeated.

BRIEF DESCRIPTION OF THE DRAWINGS

Further advantageous aspects of the invention will be apparent from the following description of preferred exemplary embodiments with reference to the drawings, in which.

DETAILED DESCRIPTION OF THE EXEMPLARY EMBODIMENTS

Figure 1:
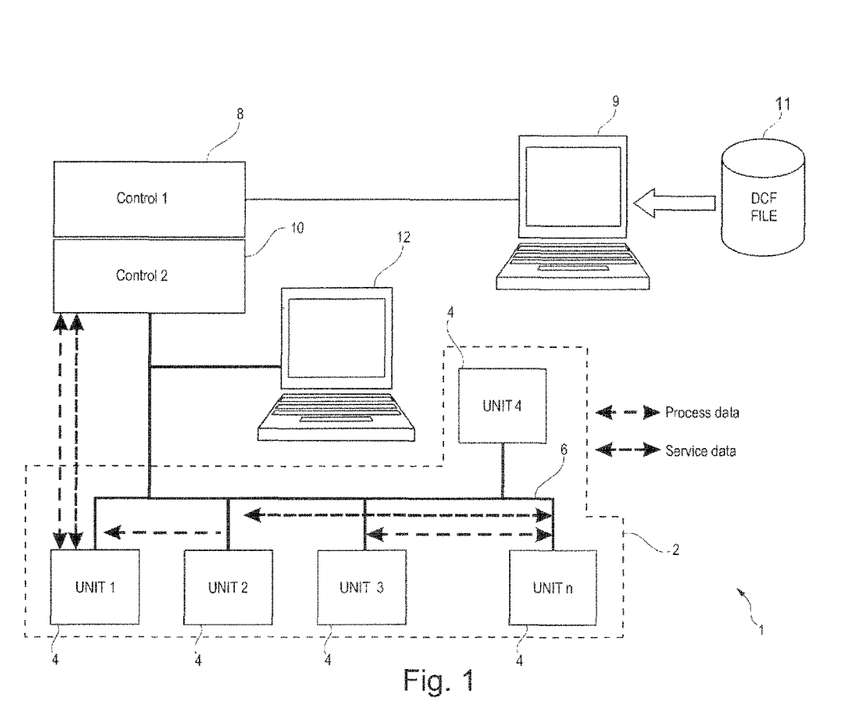
FIG. 1 shows a schematic illustration of a fluidic system which comprises a BUS system, according to an exemplary embodiment.

FIG. 1 shows a schematic and simplified illustration of a fluidic system 1 according to an exemplary embodiment. It comprises a BUS system 2 according to an exemplary embodiment. The BUS system 2 comprises a multitude of users 4, denoted by "unit 1" to "unit n". The number of users 4 is limited merely by the communication protocol of the BUS system 2. The BUS system 2 may be an asynchronously, serially operating BUS system, in particular a field bus system. In particular, the BUS system 2 may be a CAN-BUS system (CAN=Controller Area Network), which operates in accordance with the CAN standard. The communication protocol used may be, for example, CANopen, which operates in accordance with the standard defined by CiA (CiA=CAN in Automation).

The users 4, which are connected among one another by a data line 6, may, more particularly, be fluidic components of the fluidic system 1. As is usual in the CAN-based BUS systems, a two- or four-wire copper line may be used for the data line 6. The fluidic components may be, e.g., valves, sensors, measuring instruments, automatic controllers, actuators, regulators, etc. Users 4 may also be display devices, control units or gateways for programming or monitoring the fluidic system 1.

The users 4 of the BUS system 2 can communicate with one another both unidirectionally and bidirectionally. Both service data and process data can be transmitted. This is indicated by respective arrows in FIG. 1. If a CANopen-based BUS system is involved, the service data is transferred in SDO telegrams (SDO=Service Data Object), and the process data is transferred in PDO telegrams (PDO=Process Data Object). Communication is not limited to the BUS system 2 itself. In the same way, the individual users 4 can also communicate with an externally arranged first controller 8 (controller 1). In particular, a DCF (Device Configuration File) can be transferred from a memory 11 to one or more users 4 of the BUS system 2 via a control computer 9 and the first controller 8, for the configuration of the users 4. The device configuration file primarily serves to transfer the device settings to the users 4.

The users 4 can be conferred a further functionality, exceeding their functionality in accordance with the CAN or CANopen standard. This further functionality will now be described below and can be conferred to the users 4 by the users 4 being configured for this purpose by means of a further control computer 12 and a further controller 10 (controller 2). But the control computer 12 and the further controller 10 only serve for the corresponding configuration of the users 4. The further functionality exceeding the CAN or CANopen standard relates to the users 4 themselves and is made available by the users themselves, without further external intervention in the BUS system 2 being necessary.

This further functionality in particular relates to the ability of the users 4 of the BUS system 2 to generate a respective unique address independently or autonomously, in particular a network address within the BUS system 2, and to allocate this address to themselves.

Figure 2:
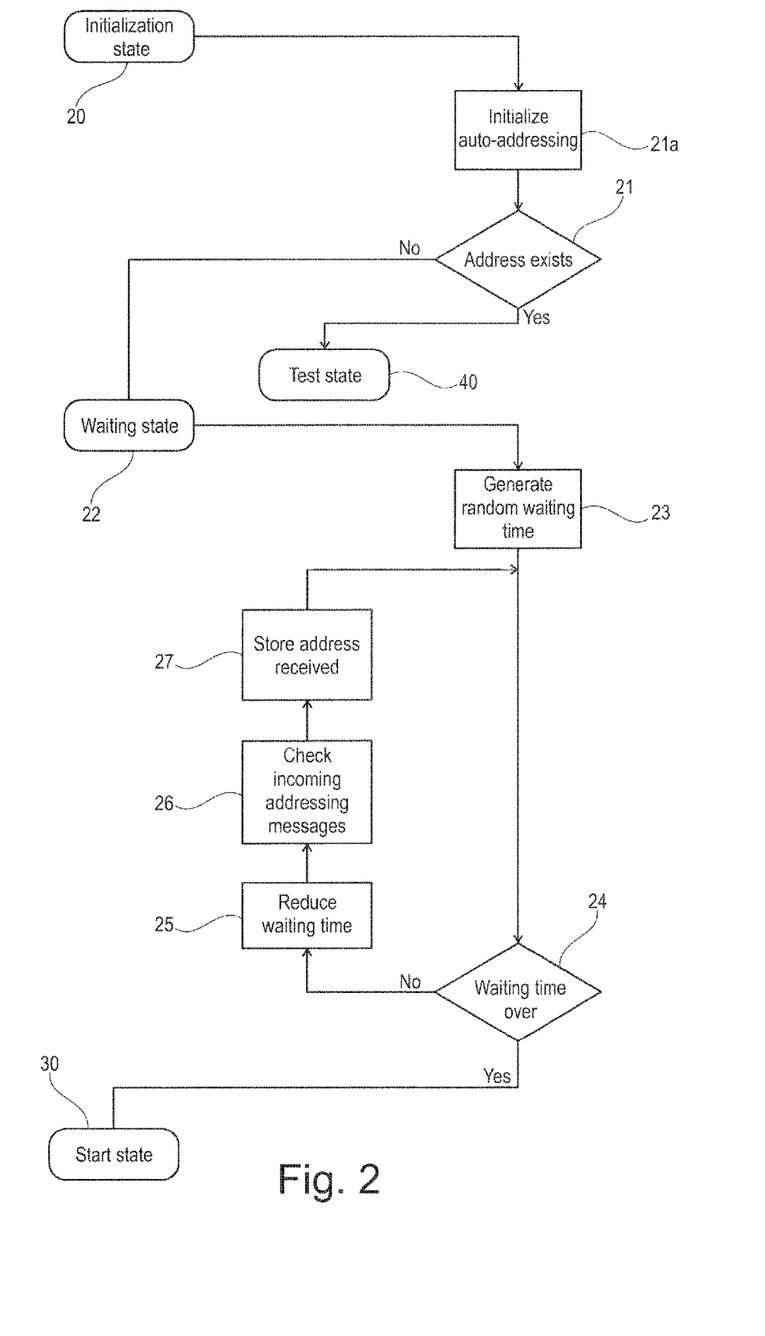
FIGS. 2 to 6 show sections of a flow chart which illustrates methods of operating a BUS system according to several exemplary embodiments.

FIG. 2 shows a first section of a flow chart of a method for network address assignment within a BUS system 2, according to an exemplary embodiment. Within the BUS system 2, some, but more particularly all, users 4 can be configured to carry out such a method.

Starting in an initialization state 20, a user 4 of the BUS system 2 at first initializes 21a the method of auto-addressing described below. Then the user 4 checks 21 whether it already has a predetermined address or an address defined in the context of a preceding addressing process. If this is the case, the user 4 directly passes into a check status or test state 40 (see also FIG. 4). If the user 4 has no fixed address, it enters a waiting status or waiting state 22.

In the waiting state 22, first of all it generates 23 a random first waiting time. This waiting time may be between 200 ms and 2.8 s. For this purpose, the user 4 may comprise a random number generator. As a basis for the random number generator for generating this first waiting time, use may be made of, e.g., a processor identification number, a manufacturing number, or else an external signal or event such as, e.g., a noise detected at an input of the user 4. The user 4 checks 24 whether this first waiting time has elapsed and, if this is the case, it enters a start status or start state 30. If the first waiting time has not yet elapsed, this waiting time is reduced 25. In addition, the user 4 may be designed to receive incoming address telegrams and to check 26 the addresses contained therein. In the context of this description, address telegrams shall also be referred to as addressing messages. An address telegram may be a telegram in accordance with the CAN standard and/or in accordance with the CANopen communication protocol. The addresses received may be saved 27 in an internal memory of the user 4. Steps 25 to 27 may be repeated cyclically until the first waiting time elapses.

Subsequently, the user 4 proceeds to the start state 30. This part of the method is shown in the portion of the flow chart illustrated in FIG. 3. The user 4 generates 31 a waiting time and produces 32 its own random and preliminary address. The waiting time may be between 40 ms and 630 ms. In particular, the user 4 may be configured to produce a free or non-utilized address. In this respect, a conflict with the addresses, stored and received in step 27 (FIG. 2), of other users 4 of the BUS system 2 is avoided. In other words, the user 4 generates its own address, which is different from all stored addresses of the other users 4.

Figure 3:
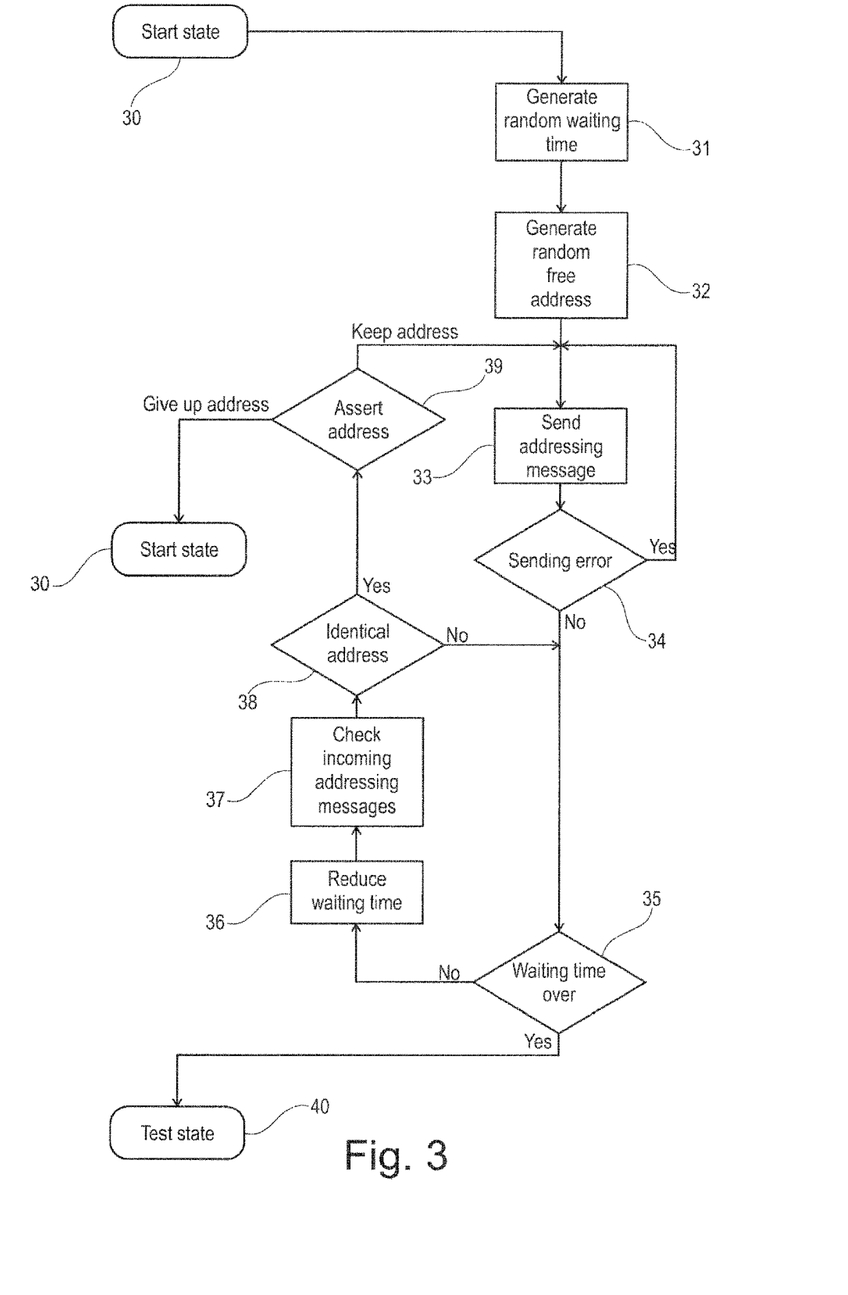

Subsequently, the user 4 sends 33 its preliminary and random address to the other users 4 of the BUS system 2 in an address telegram. If a transmission error or sending error occurs 34 in the transmission of the address telegram, the address telegram is sent again 33. The user 4 checks 35 whether the waiting time generated in step 31 has elapsed. If this is the case, the user 4 directly enters the checking state or test state 40. If the waiting time has not yet elapsed, it is reduced 36, and the user 4 continues to receive and check 37 the addresses in the address telegrams received.

The addresses received are checked 38 for a conflict with the user's 4 own preliminary address. Provided that no conflict exists, the method passes through steps 35 to 38 up to the lapse of the waiting time. In case a conflict occurs between an address received and the user's 4 own preliminary address, this conflict can be selectively resolved on the basis of a comparison of the serial numbers or manufacturer numbers or on the basis of a comparison between the hierarchy status of the sender and the hierarchy status of the recipient. In this context, a lower serial number or a lower or smaller manufacturer number may stand for a higher priority. Of course, a reverse definition may also be made, so that a higher serial number or a larger manufacturer number stands for a higher priority. In other words, the user having a lower or smaller manufacturer number or serial number can therefore prevail over that user having a higher or larger manufacturer number or serial number. The user 4 having the lower or smaller manufacturer number or serial number defends and keeps its address, whereas the user 4 having the higher or larger manufacturer number or serial number gives up its address. This occurs in step 39.

If the conflict of addresses is resolved 39 on the basis of the hierarchy status of the users 4, the user 4 at first reads information relating to the hierarchy status of the sender as contained in the address telegram. As a criterion for determining the hierarchy status, a state or operating state of the user 4 may be made use of, for example. Further, an identification number of the user 4 may be utilized as the basis for its status within an overall hierarchy of the BUS system 2. Also, the users 4 may be provided with a specific hierarchy status.

The user 4 having the higher hierarchy status keeps and/or defends its address and sends 33 it to the other users 4 of the BUS system 2 in a further address telegram. If, on the other hand, the user 4 realizes in step 39 that its hierarchy status is lower than that of the user 4 sending the address telegram, the user 4 gives up its own preliminary address and enters the start state 30 again.

When the user 4 has successfully found an address that is not yet occupied, this address is verified in a check status or test state 40. This part of the method will be explained with reference to the portion of the flow chart shown in FIG. 4. At first, the user 4 generates 41 a second waiting time. This random second waiting time may be between 40 ms and 630 ms. Monitoring of both the first and second waiting times can be effected with the aid of a timer provided in a microprocessor or by task managing.

Figure 4:
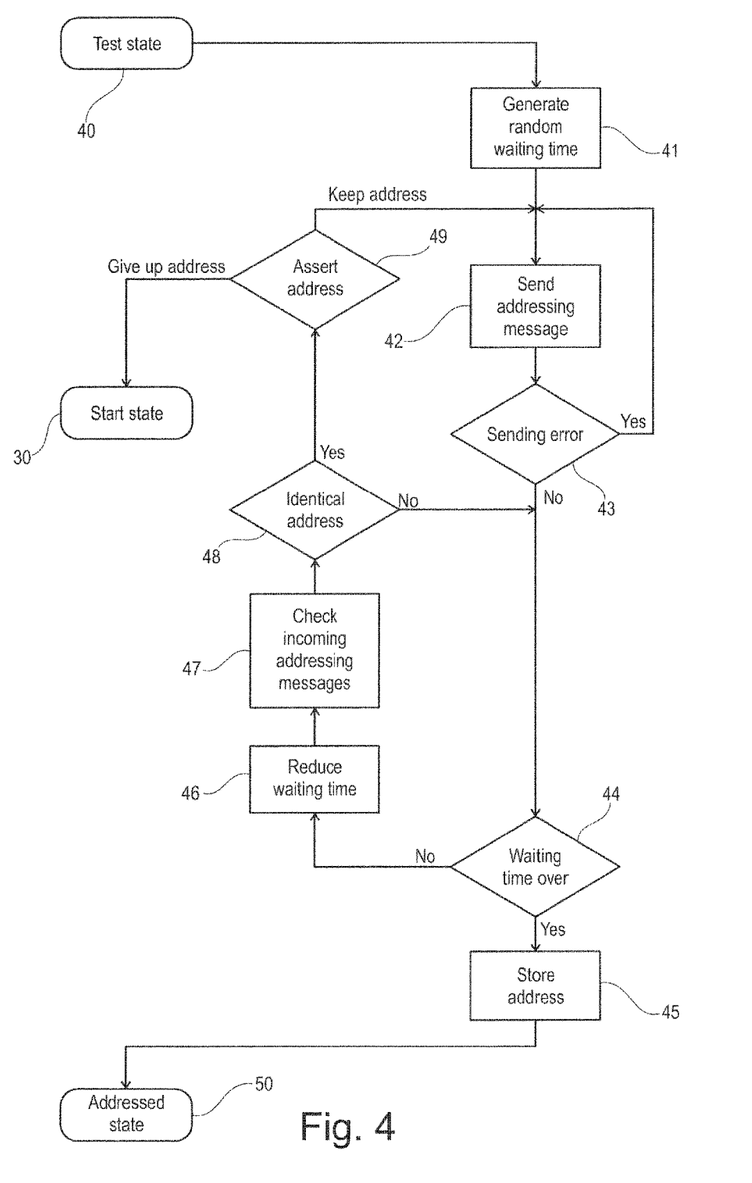

During the verification the user 4 sends 42 its address to the other users 4 of the BUS system 2 in a further address telegram. Should an error occur 43 in the transmission of the address telegram, the address telegram is sent again 42. The user 4 checks 44 whether the second waiting time has elapsed. Should this be the case, the user 4 defines its preliminary address as the final and fixed address in step 45. If the second waiting time has not yet elapsed, this waiting time is reduced 46, and the user 4 receives and checks 47 the incoming address telegrams. If in these address telegrams no address is claimed 48 which is in conflict with the user's 4 own address, the process passes through steps 44 and 46 to 48 until the second waiting time has elapsed. If, however, a conflict with the user's own address occurs, this conflict is resolved 49. The conflict resolution 49 may again be effected with the aid of the hierarchy status of the users 4 or with the aid of the serial or manufacturer numbers, in the way as has already been described in connection with step 39 in FIG. 3. Should the user 4 be forced to give up its own address, it enters the start state 30 once more. If, on the other hand, the user 4 defends its address, it again sends 42 this address to the other users 4 of the BUS system 2 in an address telegram. When the user 4 has successfully defined 45 its address, the user 4 enters a permanent operating state 50, which is also referred to as addressed state.

Figure 5:
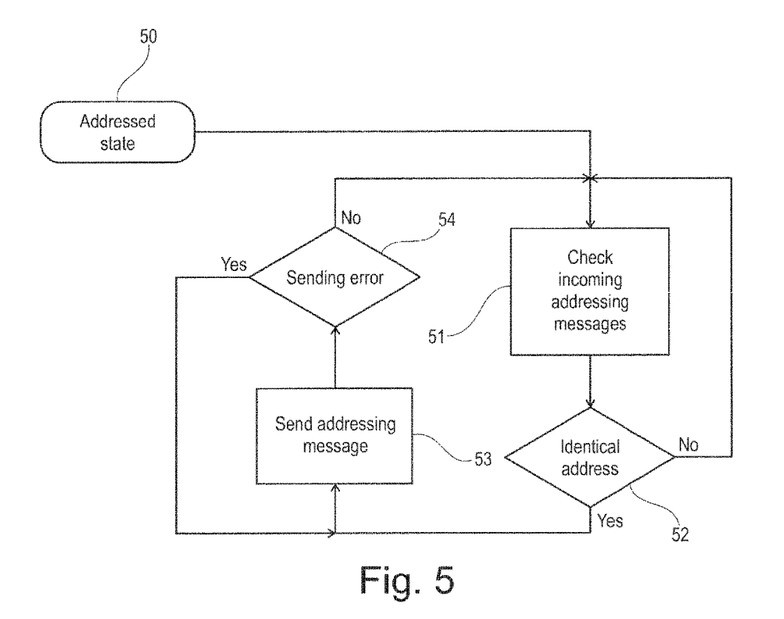

When the user 4 is in the addressed state 50—this part of the flow chart is shown in FIG. 5—the user 4 will not change its defined address again. It merely checks 51 any incoming address telegrams of other users 4 of the BUS system 2 for the preliminary addresses of the other users 4 contained therein. If such a preliminary address is in a conflict 52 with its own fixed address, the user 4 responds thereto merely by sending 53 an address telegram which comprises its own fixed address. If this is not the case, the user 4 continues to check 51 the incoming address telegrams. Should a transmission error occur 54 while the address telegram is sent 53, the address telegram is sent again.

Figure 6:
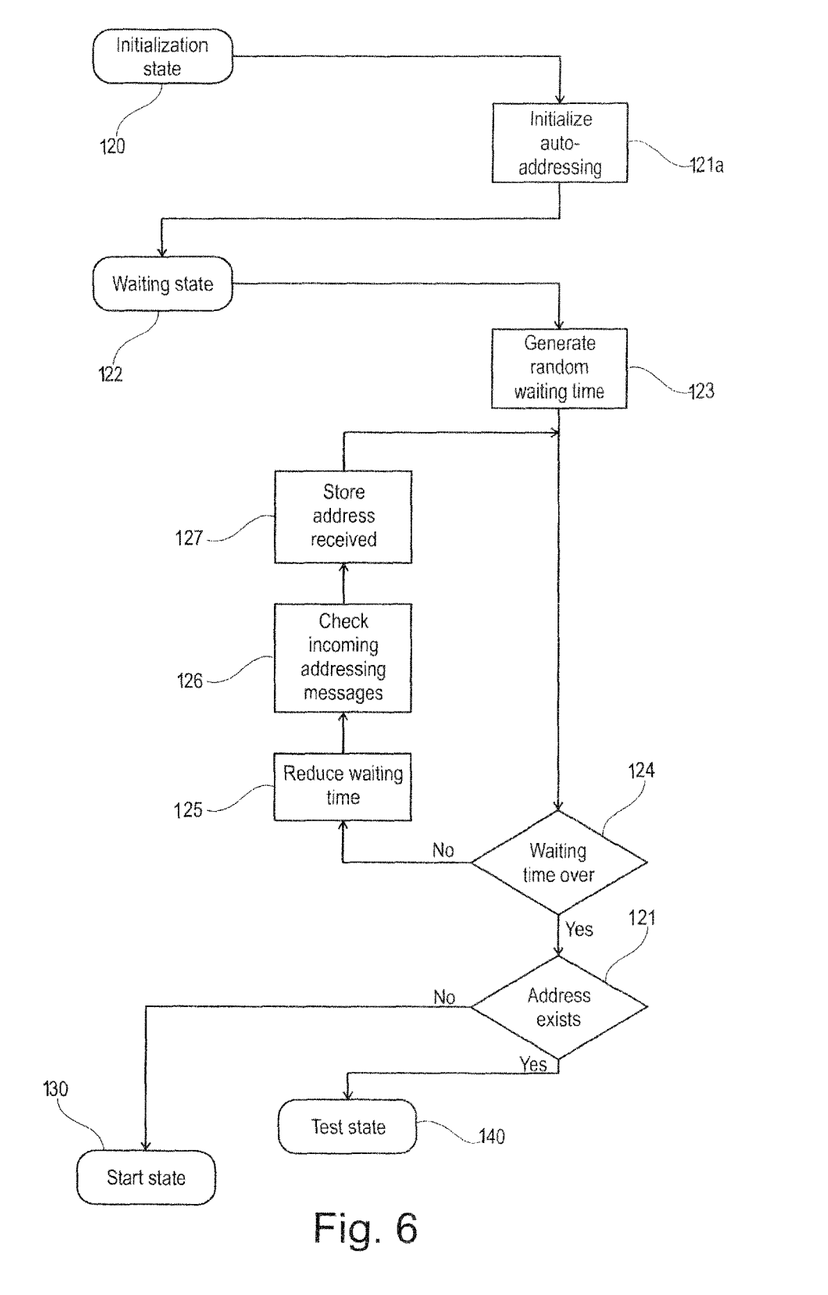

FIG. 6 shows a section of a flow chart which describes a method according to a further exemplary embodiment. Proceeding from an initialization state 120, at first the method for auto-addressing is initialized 121a. The user 4 then passes into the waiting state 122. It generates 123 a random first waiting time, which may, in particular, be within an interval of between 200 ms and 2.8 s. Subsequently, the user 4 checks 124 whether this first waiting time has elapsed. If this is not the case, the waiting time is reduced 125. The user 4 checks 126 any incoming address telegrams and stores 127 the received addresses of other users 4. Steps 125 to 127 are repeated until such time as the first waiting time generated in step 123 has elapsed. If this is the case, the user 4 checks 121 whether it already has an address at its disposal, for example a default address. If this is the case, the user 4 directly passes into the test state 140. Should the user 4 not have an address at its disposal, it enters the start state 130.

Figure 7:
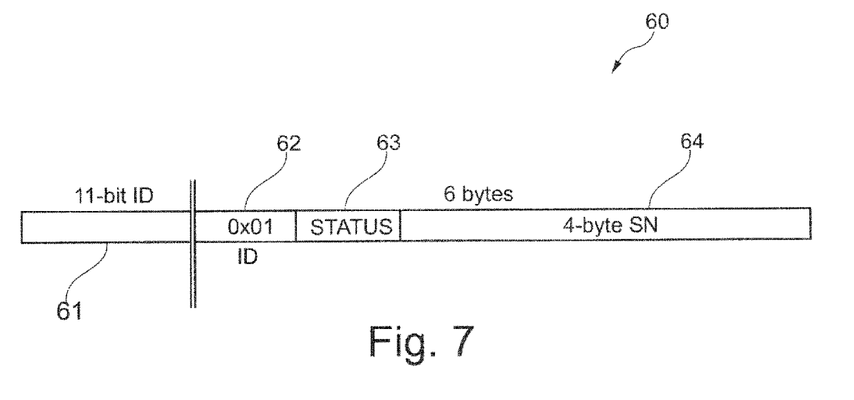
FIG. 7 shows an address telegram according to an exemplary embodiment.

FIG. 7 shows an exemplary embodiment of an address telegram 60 in a BUS system 2 which uses CANopen as the communication protocol. The address telegram 60 may comprise an object identification field 61 which is 11 bits long. This field is not defined by the CANopen standard and may contain information describing the data object. Field 62 may identify the type of message sent. For example, it may be specified in this field 62 that the address telegram 60 is a message which was sent in the context of the auto-addressing described. Field 63 may specify the status or state of the user 4. For example, a "0x04" bit sign may stand for the start state 30, a "0x05" bit sign may stand for the test state 40, and a "0x06" bit sign may stand for the operating or addressed state 50. Field 64, finally, may comprise a serial number of the user 4 up to 4 bits long.

The invention claimed is:

1. A BUS system comprising a multitude of users which users autonomously generate a respective unique address within the BUS system and allocate the respective unique address to themselves, wherein users are devices, and wherein the BUS system is a field bus system that is compatible with CANopen;

wherein information regarding an allocation feature is transmitted to the users of the BUS system by the other users of a group of users of the BUS system and by the respective users of the group themselves; wherein the information regarding the allocation feature of the users of the group is an address of these users within the BUS system, wherein the address comprises a manufacturer-assigned serial number, the address of each of the users indicating a hierarchy status of the sending user within the BUS system, and wherein resolution of address conflicts between the sending user and the other users is based on the hierarchy status, the hierarchy status being determined by the numerical value of the manufacturer assigned serial number;

wherein the group comprises all users of the BUS system, wherein all users of the BUS system are equivalent with regard to their network functionality and with regard to functionality in matters of autonomously generating a unique network address, and wherein the BUS system more particularly comprises no user having a master functionality.

2. The BUS system according to claim 1, wherein at least the users of the group of the BUS system are designed to cumulatively store and locally deposit the received information regarding the allocation feature of the other users as a complete basis for a communication with these users within the BUS system.

3. The BUS system according to claim 2, wherein the users are further designed to generate a random preliminary address of their own such that this address is different from each of the cumulatively stored addresses of the other users.

4. The BUS system according to claim 3, wherein the users are designed to transmit their address in an address telegram to the other users of the BUS system.

5. The BUS system according to claim 4, wherein the address telegram furthermore comprises information about the hierarchy status of the sending user within an overall hierarchy of the BUS system.

6. The BUS system according to claim 5, wherein at least one recipient of the address telegram is designed to check the address present in the address telegram received for a conflict with its own preliminary address and, in case of a conflict, to read out a status information of the sender that is present in the address telegram received, and
(a) if its own hierarchy status in an overall hierarchy of the BUS system ranks lower than the hierarchy status of the sender as stated in the address telegram, to give up its own preliminary address, to generate a new random preliminary address and to transmit it to the other users of the BUS system in a further address telegram;
(b) if its own hierarchy status in an overall hierarchy of the BUS system ranks higher than the hierarchy status of the sender as stated in the address telegram, to maintain its own address and to transmit this maintained address to the other users of the BUS system in a further address telegram.

7. The BUS system according to claim 4, wherein the users are designed to transmit an address telegram to the other users of the BUS system after a randomly determined first waiting time has elapsed.

8. The BUS system according to claim 4, wherein the users are designed to observe a randomly determined second waiting time after having sent at least a first address telegram, to check any address telegrams of other users coming in during this second waiting time with a view to a conflict with their own preliminary address and, if they do not receive an address telegram within the second waiting time which causes a conflict, to define their preliminary address as a fixed address.

9. The BUS system according to claim 8, wherein the users are further designed to resolve any conflict occurring within the second waiting time by means of a comparison between their own hierarchy status and the hierarchy status of the sender.

10. The BUS system according to claim 1, wherein the users of the BUS system, provided they have a fixed address, are designed to maintain their own fixed address and to transmit an address telegram comprising this fixed address to the other users of the BUS system in response to an address telegram of a further user which comprises an address that is in conflict with the fixed address.

11. A fluidic system comprising a BUS system according to claim 1, wherein at least part of the users are fluidic components.

12. A method of operating a BUS system comprising a multitude of users, which users autonomously generate a respective unique address within the BUS system and allocate the respective unique address to themselves, wherein users are devices, and wherein the BUS system is a field bus system that is compatible with CANopen;

wherein information regarding an allocation feature is transmitted to the users of the BUS system by other users of a group of the BUS system and by the respective users of the group themselves, wherein the information regarding the allocation feature of the users of the group is an address of these users within the BUS system, wherein the address comprises a manufacturer-assigned serial number, the address of each of the users indicating a hierarchy status of the sending user within the BUS system, and wherein resolution of address conflicts between the sending user and the other users is based on the hierarchy status, the hierarchy status being determined by the numerical value of the manufacturer assigned serial number;

wherein the group comprises all users of the BUS system, wherein all users of the BUS system operate equivalently with regard to their network functionality and with regard to functionality in matters of autonomously generating the unique network address, and wherein the BUS system more particularly comprises no user which operates in accordance with a master functionality.

13. The method of operating a BUS system according to claim 12, wherein at least the users of the group of the BUS system cumulatively store and locally deposit the received information regarding the allocation feature of the other users as a complete basis for a communication with these users within the BUS system.

14. The BUS system according to claim 5, wherein the users are designed to transmit an address telegram to the other users of the BUS system after a randomly determined first waiting time has elapsed.

15. The BUS system according to claim 6, wherein the users are designed to transmit an address telegram to the other users of the BUS system after a randomly determined first waiting time has elapsed.

16. The BUS system according to claim 5, wherein the users are designed to observe a randomly determined second waiting time after having sent at least a first address telegram, to check any address telegrams of other users coming in during this second waiting time with a view to a conflict with their own preliminary address and, if they do not receive an address telegram within the second waiting time which causes a conflict, to define their preliminary address as a fixed address.

17. The BUS system according to claim 6, wherein the users are designed to observe a randomly determined second waiting time after having sent at least a first address telegram, to check any address telegrams of other users coming in during this second waiting time with a view to a conflict with their own preliminary address and, if they do not receive an address telegram within the second waiting time which causes a conflict, to define their preliminary address as a fixed address.

18. The BUS system according to claim 7, wherein the users are designed to observe a randomly determined second waiting time after having sent at least a first address telegram, to check any address telegrams of other users coming in during this second waiting time with a view to a conflict with their own preliminary address and, if they do not receive an address telegram within the second waiting time which causes a conflict, to define their preliminary address as a fixed address.

* * * * *